A. McFARLANE.
Harrow.
No. 34,974.  Patented Apr. 15, 1862.
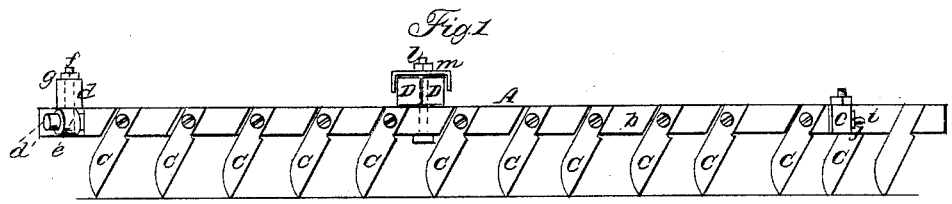
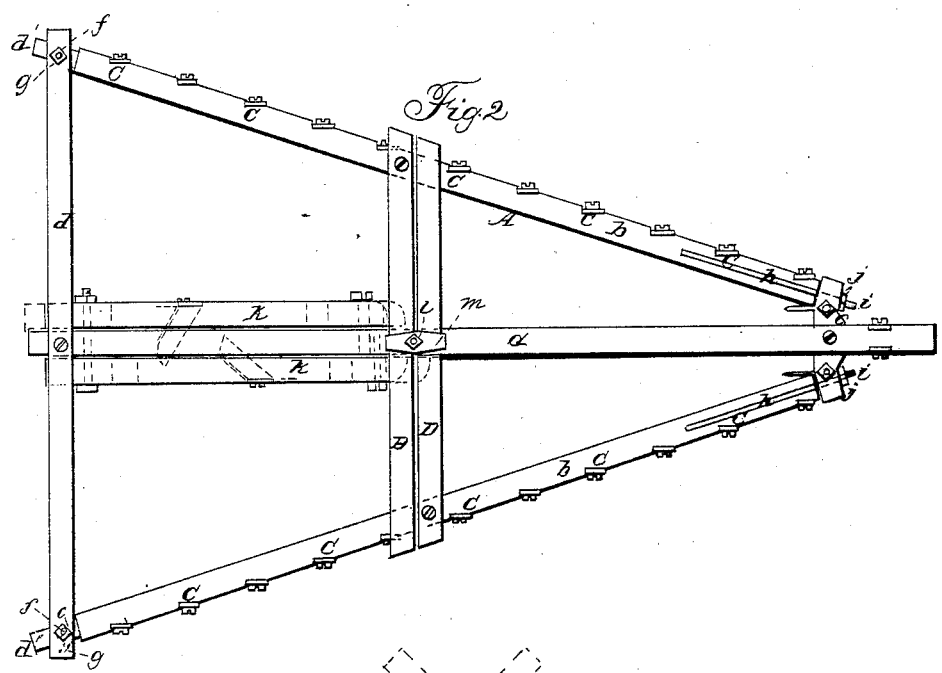
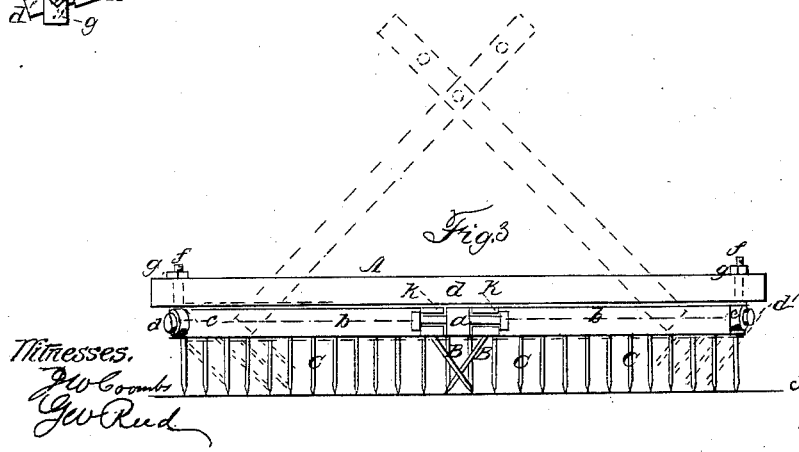
Witnesses.
J W Coombs
Geo Reed
Inventor
A McFarlane
per Munn & Co
Attorneys

UNITED STATES PATENT OFFICE.

ALEXANDER McFARLANE, OF SOUTH GENESEE, WISCONSIN.

IMPROVED DEVICE FOR CUTTING MARSHY LAND.

Specification forming part of Letters Patent No. 34,974, dated April 15, 1862.

*To all whom it may concern:*

Be it known that I, ALEXANDER MCFARLANE, of South Genesee, in the county of Waukesha and State of Wisconsin, have invented a new and Improved Implement or Device for Cutting Boggy or Marshy Lands, for the purpose of reclaiming the same for tillage; and I do hereby declare that the following is a full, clear, and exact description of the same, reference being had to the accompanying drawings, making a part of this specification, in which—

Figure 1 is a side view of my invention. Fig. 2 is a plain or top view of the same. Fig. 3 is a back view of the same.

Similar letters of reference indicate corresponding parts in the several figures.

This invention consists in having cutters or teeth attached to a suitable frame so constructed and arranged that the cutters or teeth may be adjusted to work in both a vertical and an inclined position, and the surface of boggy or marshy land thereby cut, so as to render it permeable to air and susceptible of cultivation for the growth of plants or crops.

To enable those skilled in the art to fully understand and construct my invention, I will proceed to describe it.

A represents a frame, which is constructed of a permanent or fixed central bar, *a*, and two oblique bars, *b b*, the front ends of the latter being attached to a short cross-bar, *c*, near the front end of the fixed bar *a*, and their back ends attached to the ends of a cross-bar, *d*, at the back end of bar *a*. The back ends of the oblique bars *b b* have round tenons *d' d'* cut on them, and these tenons are fitted in metal sockets or eyes *e e*, which are provided with tangs *f*, that have screw-threads cut on them, and pass vertically through the cross-bar *d* near its ends, the tangs having nuts *g* on their upper ends, by screwing up which the sockets or eyes *e e* are firmly secured to the cross-bar *d*. The tenons *d' d'* are allowed to turn freely in the sockets or eyes *e e*.

The front ends of the oblique bars *b b* are secured to the front cross-bar as follows: Each bar *b* has a flat metal bar, *h*, fitted in it longitudinally, and secured in proper position by bolts. These bars project some distance beyond the ends of the bars *b b*, and these projecting portions, which are designated by *i*, are made of cylindrical form, and have screw-threads cut on them to receive nuts *j*. The cylindrical parts *i* pass through the cross-bar *c* near its ends, and by screwing up the nuts *j* the front ends of the oblique bars *b b* will be firmly secured to bars *c*.

The frame A, as will be seen by referring to Fig. 1, is of V form, and to each side of the central fixed bar, *a*, at its back part, there is attached an adjustable or sliding bar, *k*, each of which has a cutter, B, attached obliquely to it, (see Fig. 3,) and to the oblique bars *b b* a series of similar cutters, C, are attached. The form of these cutters is clearly shown in Fig. 1. They are composed of straight blades having a rounded back edge at their lower ends. The cutters are secured to the bars *b b* in an inclined position in the plane of their draft, and they are so attached to the bars *b b* as to be in planes parallel with each other, not in planes parallel with the bars *b b*. This will be fully understood by referring to Fig. 2.

To the upper surface of each oblique bar, *b*, at about its center, there is attached a bar, D. These bars extend entirely across the frame A, and they may be secured in contact with each other side by side down on frame A by means of a screw-bolt, *l*, and clip *m*, the latter embracing the bars D D and the bolt *l* passing through it and the central bar, *a*, of the frame. (See Figs 1 and 2.) When the bars D D are thus secured the cutters C have a vertical position, as shown in Fig. 3, and vertical cuts are consequently made in the soil as the machine is drawn along. When it is desired to have the cutters make oblique cuts in the soil the nuts *j* of the cylindrical parts *i* of the bars *h* are unscrewed, and the bars D turned up or elevated, and their upper parts where they cross or intersect each other secured by together by a bolt. (See red lines, Fig. 3.) This adjustment of the bars D D causes the oblique bars *b b* to be turned so as to give the cutters *c* a lateral oblique position, and consequently oblique cuts will be made in the soil. After the bars D D are adjusted in this way the nuts *j* are screwed up to assist the holding of the bars *b* in proper position.

The implement is used by first cutting the soil vertically in the different directions at right angles with each other, and then passing the implement over the soil with the cutters adjusted to give the oblique cuts.

The adjustable or sliding bars $k$, with cutters B attached, are designed to be used when the oblique cuts are made. They may be used or not, as desired.

Having thus described my invention, what I claim as new, and desire to secure by Letters Patent, is—

The oblique cutter-bars $b\ b$, arranged, substantially as shown, to admit of the adjusting of the cutters C in a vertical and in an oblique position, for the purpose set forth.

ALEXANDER McFARLANE.

Witnesses:
 THOMAS SUGDEN,
 HORACE SMITH.